US009162836B2

United States Patent
Saito (10) Patent No.: US 9,162,836 B2
(45) Date of Patent: Oct. 20, 2015

(54) DRIVING FORCE TRANSMISSION DEVICE, MEDIUM TRANSPORT DEVICE, IMAGE READING APPARATUS AND IMAGE FORMING APPARATUS

(71) Applicant: Oki Data Corporation, Tokyo (JP)

(72) Inventor: Takashi Saito, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 14/257,285

(22) Filed: Apr. 21, 2014

(65) Prior Publication Data

US 2014/0319764 A1    Oct. 30, 2014

(30) Foreign Application Priority Data

Apr. 25, 2013    (JP) .................................. 2013-092314

(51) Int. Cl.
| | |
|---|---|
| B65H 3/06 | (2006.01) |
| B65H 5/06 | (2006.01) |
| B65H 7/14 | (2006.01) |
| F16D 3/12 | (2006.01) |
| F16D 3/68 | (2006.01) |
| G03G 15/00 | (2006.01) |
| H04N 1/00 | (2006.01) |

(52) U.S. Cl.
CPC .............. *B65H 3/0669* (2013.01); *B65H 5/062* (2013.01); *B65H 7/14* (2013.01); *F16D 3/12* (2013.01); *F16D 3/68* (2013.01); *G03G 15/602* (2013.01); *G03G 15/6529* (2013.01); *H04N 1/00* (2013.01); *B65H 2403/61* (2013.01); *B65H 2403/73* (2013.01); *G03G 2221/1657* (2013.01); *Y10T 74/19633* (2015.01)

(58) Field of Classification Search
CPC ...... B65H 3/06; B65H 3/0607; B65H 3/0669; B65H 3/0676; B65H 2403/10; B65H 2403/11; B65H 2403/42; B65H 2403/60; B65H 2403/61; B65H 2403/73; B65H 2403/946; B65H 2513/30; G03G 2221/1657; G03G 15/602

See application file for complete search history.

(56) References Cited

U.S. PATENT DOCUMENTS

| | | | | |
|---|---|---|---|---|
| 6,485,011 | B1 * | 11/2002 | Yen et al. | 271/10.03 |
| 6,661,986 | B2 * | 12/2003 | Kitayama | 399/167 |
| 6,962,332 | B2 * | 11/2005 | Su | 271/4.01 |
| 7,540,485 | B2 * | 6/2009 | Su et al. | 271/10.05 |
| 7,623,811 | B2 * | 11/2009 | Sato | 399/167 |
| 7,664,431 | B2 * | 2/2010 | Jang et al. | 399/167 |
| 7,949,285 | B2 * | 5/2011 | Yoon | 399/167 |
| 8,182,389 | B2 * | 5/2012 | Koizumi | 476/72 |
| 8,511,667 | B2 * | 8/2013 | Kuo | 271/10.13 |

FOREIGN PATENT DOCUMENTS

| | | |
|---|---|---|
| JP | S62-274134 A | 11/1987 |
| JP | H02-079158 U | 6/1990 |
| JP | 2002-340005 A | 11/2002 |
| JP | 2009-067561 A | 4/2009 |
| JP | 2012-220665 A | 11/2012 |

* cited by examiner

*Primary Examiner* — Ernesto Suarez
(74) *Attorney, Agent, or Firm* — Rabin & Berdo, P.C.

(57) ABSTRACT

A driving force transmission device includes a first rotating portion having a first facing portion, and a second rotating portion having a second facing portion. The second rotating portion has an operation range partially overlapping with that of the first facing portion. A cushioning member is provided between the first facing portion and the second facing portion. The cushioning member is deformed by being applied with a pressure. The first rotating portion and the second rotating portion transmit a driving force in a state where the cushioning member is deformed by application of the pressure.

5 Claims, 11 Drawing Sheets

DRIVING FORCE TRANSMISSION DEVICE, MEDIUM TRANSPORT DEVICE, IMAGE READING APPARATUS AND IMAGE FORMING APPARATUS

BACKGROUND OF THE INVENTION

The present invention relates to a driving force transmission device, a medium transport device, an image reading apparatus and an image forming apparatus.

A driving force transmission device is used in, for example, a drum-type photoengraving scanner. The driving force transmission device includes a toothed belt and a toothed pulley meshing with each other. Conventionally, vibration may occur at a starting position and a terminate position of meshing between the toothed belt and the toothed pulley. In order to absorb such vibration, there is proposed a toothed pulley including an inner ring portion, an outer ring portion, and vibration absorbers provided at a boundary portion between the inner ring portion and the outer ring portion (see, for example, Japanese Laid-open Patent Publication No. 62-274134).

In this regard, if the driving force transmission device is used in a scanner or the like, a change in load on the driving force transmission device may occur. In such a case, it is difficult to suppress a change in speed.

SUMMARY OF THE INVENTION

An aspect of the present invention is intended to provide a driving force transmission device, a medium transport device, an image reading apparatus and an image forming apparatus capable of suppressing a change in speed even when a change in load occurs.

According to an aspect of the present invention, there is provided a driving force transmission device including a first rotating portion having a first facing portion, and a second rotating portion having a second facing portion. The second rotating portion has an operation range partially overlapping with that of the first facing portion. A cushioning member is provided between the first facing portion and the second facing portion. The cushioning member is deformed by being applied with a pressure. The first rotating portion and the second rotating portion transmit a driving force in a state where the cushioning member is deformed by application of the pressure.

With such a configuration, a change in speed can be suppressed even when a change in load on the driving force transmission device occurs (for example, when the driving force transmission device is used in a scanner or the like).

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, a driving force transmission device used in a medium transport device of an image reading apparatus will be described with reference to drawings.

Embodiment 1

Configuration of Image Reading Apparatus

Figure 1:
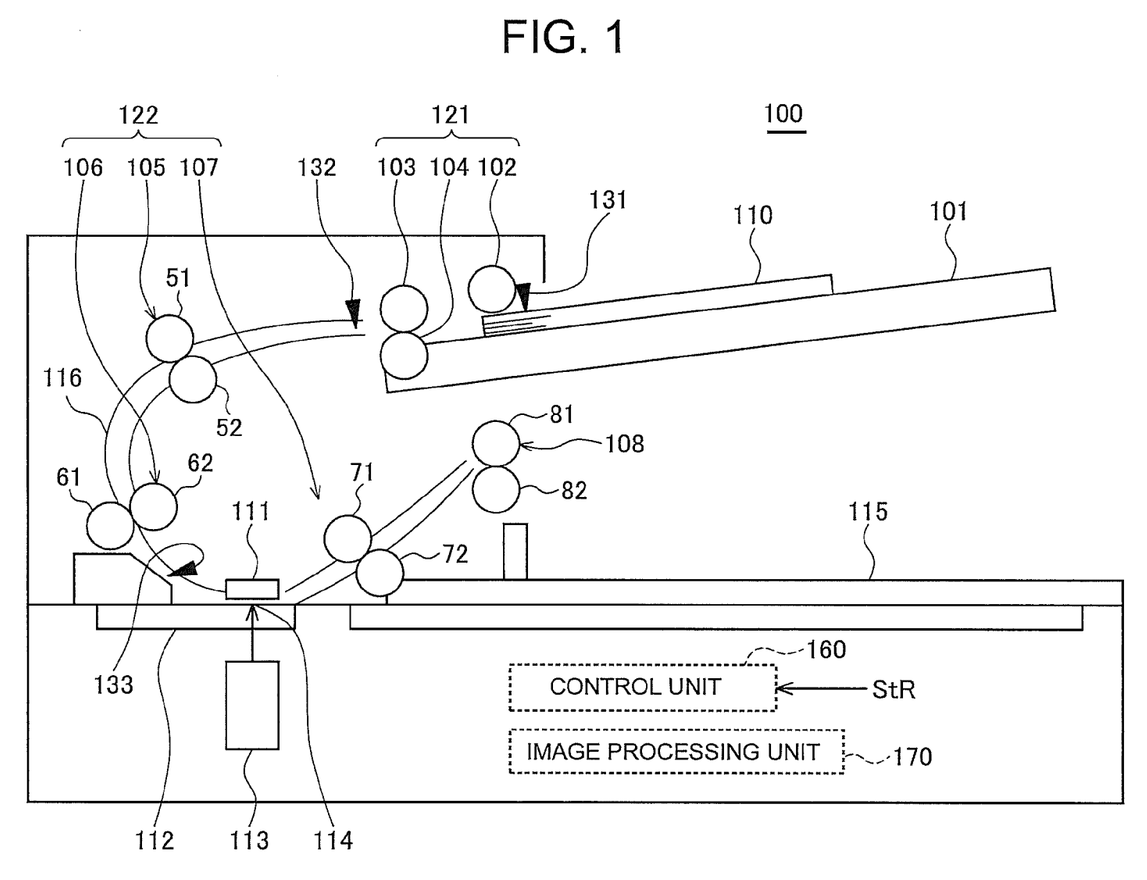
FIG. 1 is a schematic sectional view showing a configuration of an image reading apparatus according to Embodiment 1 of the present invention.

FIG. 1 is a perspective view showing a configuration of an image reading apparatus according to Embodiment 1.

The image reading apparatus 100 includes a medium placing plate 101 (i.e., a medium storage portion) on which a stack of sheet-like document media 110 is placed. The image reading apparatus 100 further includes a pickup roller 102, a feeding roller 103 and a separation roller 104. The pickup roller 102 is disposed so as to contact a surface of the topmost document medium 110 of the stack on the medium placing plate 101. The pickup roller 102 is driven to rotate by a driving system (described later), and feeds the document medium 110 toward the feeding roller 103 and the separation roller 104. The feeding roller 103 and the separation roller 104 are disposed so as to contact each other. The feeding roller 103 is driven to rotate, and feeds the document medium 110 fed by the pickup roller 102. The separation roller 104 is driven to rotate when a toque transmitted from the feeding roller 103 via the document medium 110 exceeds a limit, and separates each document medium 110 from other (i.e., subsequent) document media 110. The pickup roller 102, the feeding roller 103 and the separation roller 104 constitute a feeding unit 121.

The image reading apparatus 100 further includes first transport rollers 105, second transport rollers 106, a holding member 111, and a third transport rollers 107. The first transport rollers 105, the second transport rollers 106, the holding member 111 and the third transport rollers 107 are arranged along a medium transport path 116. A transparent plate 112 is disposed below and facing the holding member 111. A reading unit 113 is disposed below the transparent plate 112.

The first transport rollers 105 include a driving roller 51 driven to rotate by the driving system (described later), and a driven roller 52 that rotates following a rotation of the driving roller 51. The first transport rollers 105 transport the document medium 110 (fed by the feeding unit 121) along the medium transport path 116.

The second transport rollers 106 include a driving roller 61 driven to rotate by the driving system (described later), and a driven roller 62 that rotates following a rotation of the driving roller 61. The second transport rollers 106 transport the document medium 110 (transported by the first transport rollers 105) along the medium transport path 116.

The holding member 111 holds the document medium 110 so that the document medium 110 slides on a surface of the transparent plate 112.

The reading unit 113 optically reads an image on the document medium 110 when the document medium 110 passes a reading position 114 on the transparent plate 112.

The third transport rollers 107 include a driving roller 71 driven to rotate by the driving system (described later), and a driven roller 72 that rotates following a rotation of the driving roller 71. The third transport rollers 107 transport the document medium 110 (having passed the reading position 114) along the medium transport path 116.

The first transport rollers 105, the second transport rollers 106 and the third transport rollers 107 constitute a transport unit 122 that transports the document medium 110 feed by the feeding unit 121.

The image reading apparatus 100 further includes ejection rollers 108, and a medium ejection plate 115.

The ejection rollers 108 include a driving roller 81 driven to rotate by the driving system (described later), and a driven roller 82 that rotates following a rotation of the driving roller 81. The ejection rollers 108 eject the document medium 110 transported by the third transport rollers 107. The medium ejection plate 115 receives the document medium 110 ejected by the ejection rollers 108.

A first sensor 131, a second sensor 132 and a third sensor 133 are disposed along the medium transport path 116. The first sensor 131 detects presence/absence of the document medium 110 on the medium placing plate 101 (i.e., a tray). The second sensor 132 detects that the document medium 110 is fed by the feeding unit 121. The third sensor 133 detect that the document medium 110 reaches a predetermined position upstream and in the vicinity of the reading position 114. A timing to start reading the document medium 110 by the reading unit 113 is determined based on a timing when the third sensor 133 detects a leading edge of the document medium 110.

<Configuration of Driving System>

Figure 2:
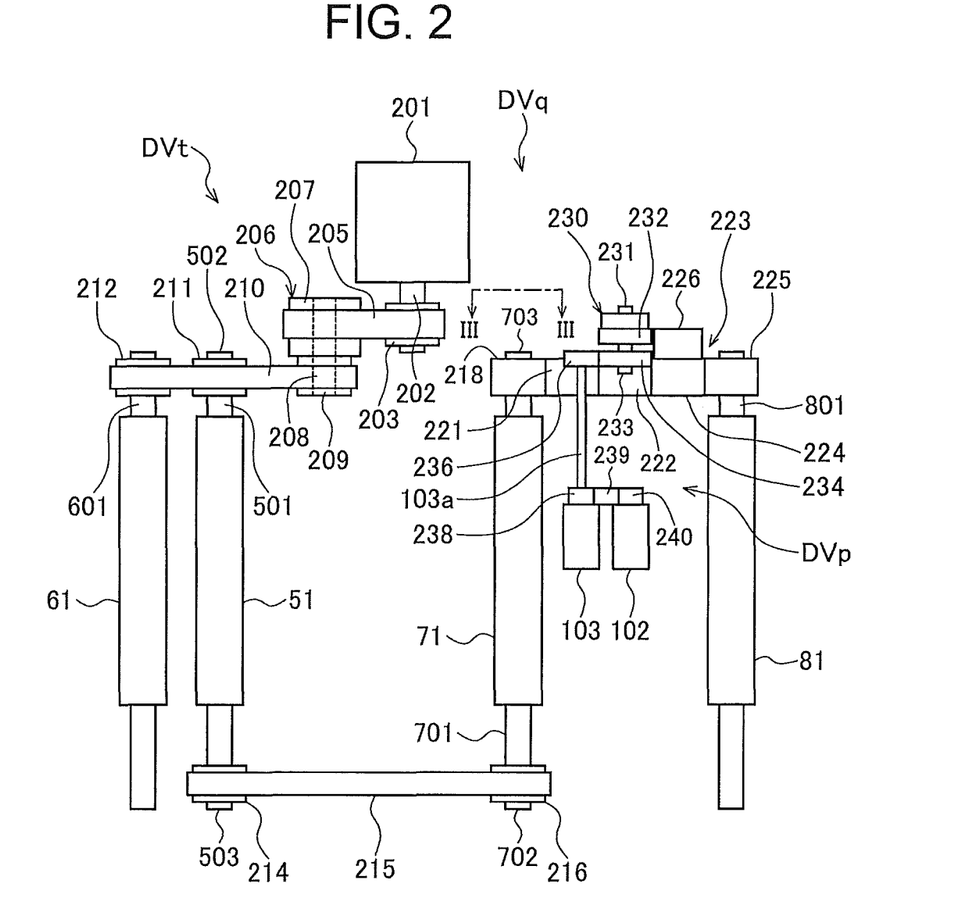
FIG. 2 is a schematic view showing a driving system of the image reading apparatus shown in FIG. 1.

FIG. 2 is a schematic view showing the driving system of the image reading apparatus 100. The driving system includes a motor 201 as a driving source. The motor 201 is driven at a constant speed by means of constant speed control. The motor 201 has a rotation shaft 202. A toothed pulley 203 is fixed to the rotation shaft 202. The toothed pulley 203 meshes with a toothed belt 205. The toothed belt 205 also meshes with a first pulley 207. The first pulley 207 is a part of a reduction pulley 206. The reduction pulley 206 also includes a second pulley 209 fixed to the first pulley 207 via a shaft 208. A rotation of the motor 201 is transmitted to the first pulley 207 of the reduction pulley 206 via the toothed belt 205.

The second pulley 209 of the reduction pulley 206 meshes with a toothed belt 210. The toothed belt 210 also meshes with a toothed pulley 211 and a toothed pulley 212. A rotation of the reduction pulley 206 is transmitted to the toothed pulley 211 and the toothed pulley 212 via the toothed belt 210.

The toothed pulley 212 is fixed to an end of a shaft 601 of the driving roller 61 (i.e., a second transport driving roller) of the second transport rollers 106. The toothed pulley 211 is fixed to an end 502 of a shaft 501 of the driving roller 51 (i.e., a first transport driving roller) of the first transport rollers 105. A toothed pulley 214 is fixed to the other end 503 of the shaft 501 of the driving roller 51.

The toothed pulley 214 meshes with a toothed belt 215. The toothed belt 215 also meshes with a toothed pulley 216. A rotation of the toothed pulley 214 is transmitted to the toothed pulley 216 via the toothed belt 215. The toothed pulley 216 is fixed to an end 702 of a shaft 701 of the driving roller 71 (i.e., a third transport driving roller) of the third transport rollers 107. A gear 218 is fixed to the other end 703 of the shaft 701 via a coupling 220 (i.e., a shaft coupling) having a cushioning effect as described later. In this regard, the coupling 220 is not shown in FIG. 2.

The gear 218 meshes with an idle gear 221. The idle gear 221 meshes with an idle gear 222. The idle gear 222 meshes with a first gear 224. The first gear 224 is a part of a two-stage gear 223. The two-stage gear 223 also includes a second gear 226. The first gear 224 meshes with a gear 225. A rotation of the gear 218 is transmitted to the first gear 214 via the idle gears 221 and 222. A rotation of the first gear 224 is transmitted to the gear 225. The gear 225 is fixed to a shaft 801 of the driving roller 81 (i.e., an ejection driving roller) of the ejection rollers 108.

The second gear 226 of the two-stage gear 223 meshes with a gear 232. The gear 232 is fixed to an input shaft 231 of an electromagnetic clutch 230 (i.e., a connection-and-disconnection unit). A gear 234 is fixed to an output shaft 233 of the electromagnetic clutch 230. The gear 234 meshes with a gear 236. The gear 236 is fixed to a shaft 103a of the feeding roller 103. Further, a rotation of the shaft 103a is transmitted to the pickup roller 102 via gears 238, 239 and 240.

<Coupling>

Figure 3:
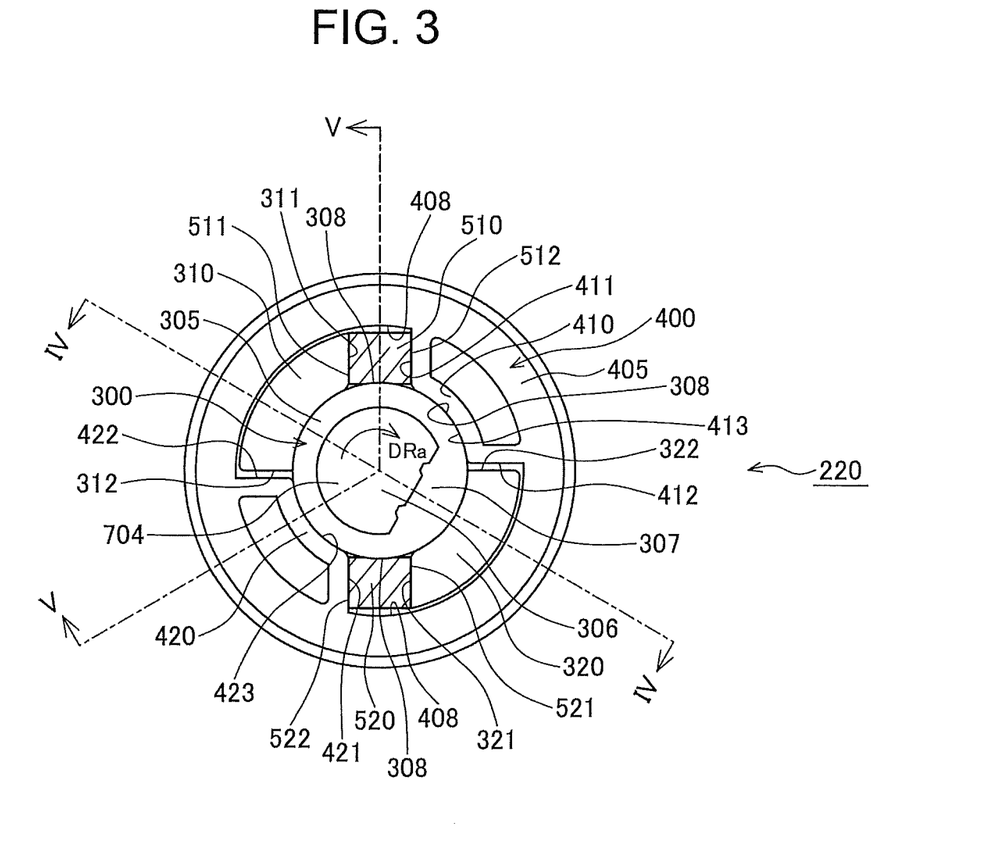
FIG. 3 is a view of a flexible coupling as seen in a direction indicated by arrows III in FIG. 2.
Figure 4:
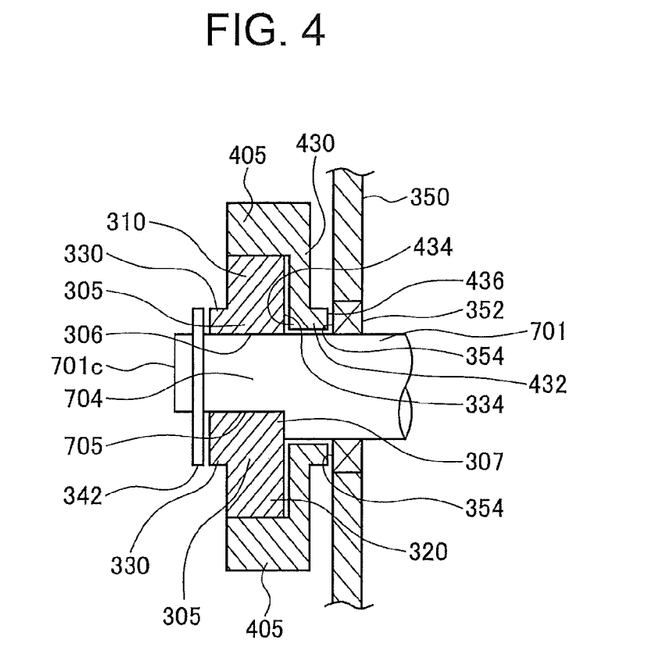
FIG. 4 is a sectional view taken along line IV-IV shown in FIG. 3.
Figure 5:
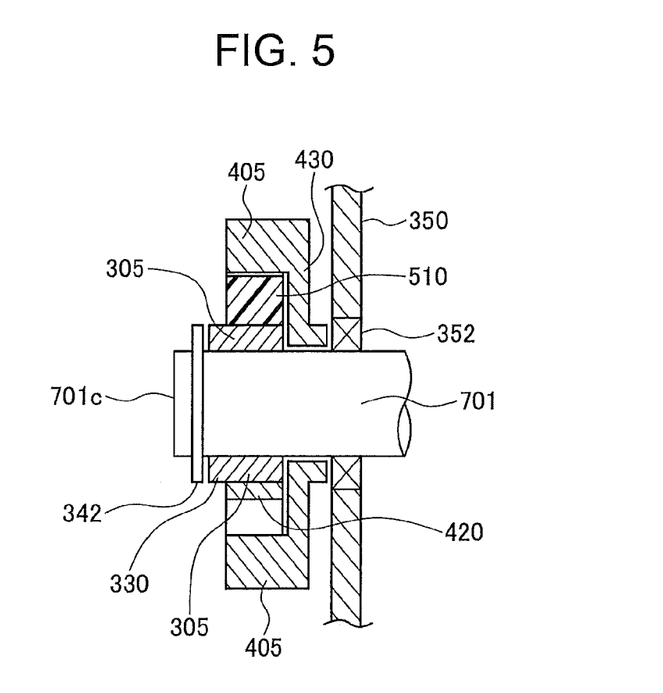
FIG. 5 is a sectional view taken along line V-V shown in FIG. 3.
Figure 6:
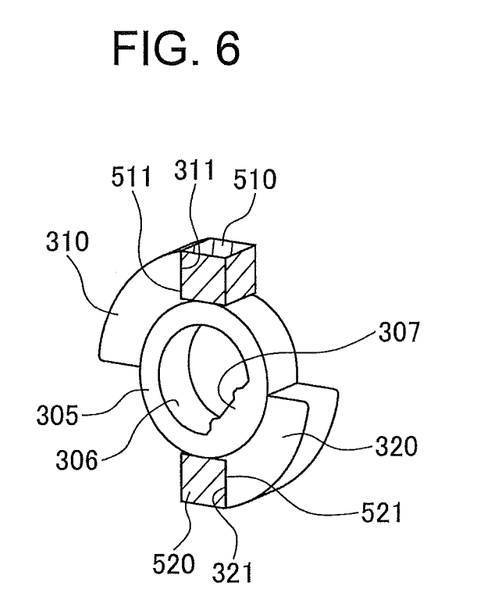
FIG. 6 is a perspective view showing a part of the flexible coupling shown in FIG. 2.

The coupling 220 will be described with reference to FIGS. 3 through 6. FIG. 3 is a view of the coupling (i.e., the flexible coupling) 220 as seen in a direction shown by arrows in FIG. 2. FIG. 4 is a sectional view taken along line IV-IV in FIG. 3. FIG. 5 is a sectional view taken along line V-V in FIG. 3. FIG. 6 is a perspective view showing a part of the coupling 220.

The coupling 220 includes an inner ring 300 (i.e., a first rotating portion) and an outer ring 400 (i.e., a second rotating portion). The shaft 701 of the driving roller 71 is rotatably supported by a frame 350 via a bearing 352 (see FIGS. 4 and 5). The inner ring 300 has a cylindrical portion (i.e., a sleeve) 305. The cylindrical portion 305 is fixed to the shaft 701 of the driving roller 71, and rotates together with the shaft 701.

The shaft 701 penetrates a through-hole 306 formed on the cylindrical portion 305. The shaft 701 has a circular cross section except for a portion penetrating the through-hole 306. A portion of the shaft 701 penetrating the through-hole 306 has a D-shaped cross section (having a circular arc-shaped part and a straight part). In other words, a part (i.e., a cutout part 705) of a circumference of a portion 704 of the shaft 701 penetrating the through-hole 306 is cut out by a plane parallel to a rotation axis of the shaft 701.

The cylindrical portion 305 has a portion 307 protruding inwardly in a radial direction. The through-hole 306 formed on the cylindrical portion 305 has a D-shaped cross section (in a plane perpendicular to an axial direction) corresponding to the cross sectional shape of the shaft 701.

The shaft 701 penetrates and is fixed to the through-hole 306 so that cutout part 705 faces the protruding portion 307. With such a configuration, the cylindrical portion 305 is not rotatable relative to the shaft 701. That is, the cylindrical portion 305 and the shaft 701 rotate together with each other.

The cylindrical portion 305 has a part 330 extending toward an end surface 701c of the shaft 701. The extending part 330 contacts a retainer ring 342 fixed to the shaft 701 in the vicinity of the end surface 701c. Therefore, the inner ring 300 is prevented from moving toward the end surface 701c of the shaft 701. In this regard, the retainer ring 342 is omitted in FIG. 2, and the extending part 330 is omitted in FIG. 6.

The inner ring 300 further includes engaging portions 310 and 320 (i.e., first engaging portion). The engaging portions 310 and 320 protrude outwardly in a radial direction from the cylindrical portion 305, and are disposed at two portions equally spaced in a circumferential direction. The engaging portions 310 and 320 are fixed to or integrally formed with the cylindrical portion 305. The engaging portion 310 has two end surfaces 311 and 312 in the circumferential direction. A cushioning member 510 is fixed to the end surface 311 (i.e., a first facing portion) of the engaging portion 310. The cushioning member 510 has two end surfaces 511 and 512 in the circumferential direction, and the end surface 511 is fixed to the end surface 311 of the engaging portion 310. The engaging portion 320 has two end surfaces 321 and 322 in the circumferential direction. A cushioning member 520 is fixed to the end surface 321 (i.e., a first facing portion) of the engaging portion 320. The cushioning member 520 has two end surfaces 521 and 522 in the circumferential direction, and the end surface 521 is fixed to the end surface 321 of the engaging portion 320.

In this regard, the number of the engaging portions 310 (320) is not limited to 2, but may be 1 or more than 2. When the number of the engaging portions is more than 2, it is preferred that the engaging portions are equally spaced in the circumference direction.

The cushioning members 510 and 520 are resiliently deformable. For example, the cushioning members 510 and 520 may be formed of elastomer material such as urethane foam or rubber, or may be formed of metal coil springs. Here, the cushioning members 510 and 520 are formed of urethane foam.

The cushioning members 510 and 520 are fixed to the engaging portions 310 and 320 using adhesive agent (bond), double sided tapes or the like.

The cushioning members 510 and 520 are disposed in the vicinity of or in contact with an outer circumferential surface 308 of the cylindrical portion 305 (except for portions where the engaging portions 310 and 320 are disposed). The cushioning members 510 and 520 are not fixed to the cylindrical portion 305. That is, the cushioning members 510 and 520 are slidable relative to the cylindrical portion 305.

The outer ring 400 includes a cylindrical portion 405 and engaging portions 410 and 420. The engaging portions 410 and 420 protrude inwardly in the radial direction from the cylindrical portion 405, and are disposed at two portions in the circumferential direction. The engaging portions 410 and 420 are fixed to or integrally formed with the cylindrical portion 405. The engaging portion 410 (i.e., a second engaging portion) has two end surfaces 411 and 412 in the circumferential direction. The end surface 411 of the engaging portion 410 is contactable with the end surface 512 of the cushioning member 510. The engaging portion 420 (i.e., a second engaging portion) has two end surfaces 421 and 422 in the circumferential direction. The end surface 421 of the engaging portion 420 is contactable with the end surface 522 of the cushioning member 520. When the shaft 701 rotates in a direction shown by an arrow DRa in FIG. 3, the end surfaces 411 and 421 (i.e., a second facing portion) contact the end surfaces 512 and 522, so that a torque (i.e., a driving force or a rotational force) is transmitted from the inner ring 300 to the outer ring 400. The end surfaces 412 and 422 are contactable with the end surfaces 312 and 322 of the engaging portion 310 and 320.

The engaging portions 410 and 420 include inner circumferential surfaces 413 and 423 in the form of partial cylindrical surfaces. The inner circumferential surfaces 413 and 423 contact and are slidable on the outer circumferential surface 308 of the inner ring 300 (except for portions where the cushioning members 510 and 520 are disposed). Because of slidable contact between the outer circumferential surface 308 and the inner circumferential surfaces 413 and 423, the outer ring 400 is rotatable relative to the inner ring 300. The rotation of the outer ring 400 relative to the inner ring 300 occurs when degree of compression of the cushioning members 510 and 520 changes.

The outer ring 400 further includes a flange portion 430 (FIGS. 4 and 5) fixed to or integrally formed with the cylindrical portion 405. The flange portion 430 is disposed on an end of the cylindrical portion 405 in the axial direction located farthest from the end surface 701c of the shaft 701.

A boss portion 432 having a cylindrical shape is disposed on an inner circumference of the flange portion 430. The boss portion 432 is fixed to or integrally formed with the flange portion 430. The boss portion 432 is rotatable relative to the shaft 701. The boss portion 432 has two end surfaces 434 and 436 in the axial direction. The end surface 434 of the boss portion 432 contacts an end surface 334 of the inner ring 300 in the axial direction. The end surface 436 of the boss portion 432 contacts an end surface 354 of the bearing 352. Therefore, a movement of the inner ring 300 and the outer ring 400 in the axial direction of the shaft 701 is restricted. More specifically, the movement of the inner ring 300 in a direction away from the end surface 701c is restricted by contact between the outer ring 400 and the bearing 352. The movement of the outer ring 400 in a direction toward the end surface 701c is restricted by contact between the inner ring 300 and the retainer ring 342.

The cushioning members 510 and 520 are disposed in the vicinity of or disposed contacting an inner circumferential surface 408 of the cylindrical portion 405. The cushioning members 510 and 520 are not fixed to the inner circumferential surface 408, and therefore are slidable on the inner circumferential surface 408.

The cushioning members 510 and 520 are resiliently deformable. When the shaft 701 rotates in the direction shown by the arrow DRa (i.e., clockwise in FIG. 3), the end surfaces 512 and 522 are pressed against the end surfaces 411 and 421, so that the cushioning members 510 and 520 are compressed in the circumferential direction at a compression ratio corresponding to a load.

Figure 7A:
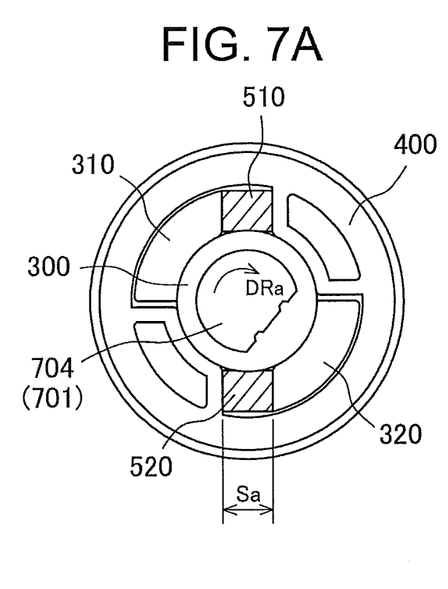
FIGS. 7A and 7B are views as seen in the same direction as FIG. 3 for showing a change in degree of compression of cushioning members of the flexible coupling.
Figure 7B:
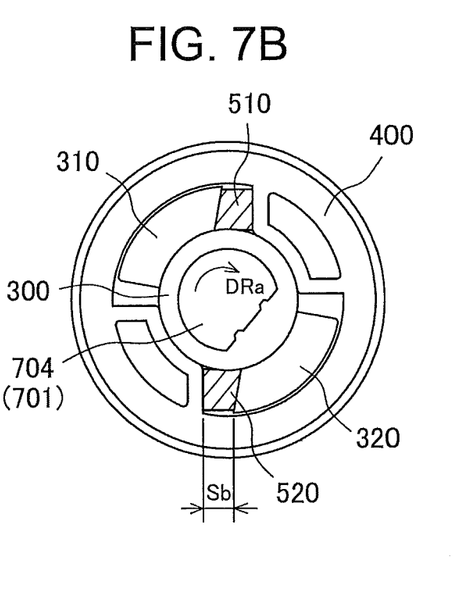

FIGS. 7A and 7B are schematic views for illustrating a change in degree of compression of the cushioning members 510 and 520 according to the load. FIG. 7A shows a state where the electromagnetic clutch 230 is turned off, and therefore a small load is applied. FIG. 7B shows a state where the electromagnetic clutch 230 is turned on, and therefore a large load is applied. In the state shown in FIG. 7A, a length of the cushioning members 510 and 520 in the circumferential direction is expressed as Sa. In the state shown in FIG. 7B, a length of the cushioning members 510 and 520 in the circumferential direction is expressed as Sb, which is shorter than the length Sa.

Referring back to FIG. 2, components starting from the toothed pulley 203 to the shaft 701 of the third transport driving roller 71 constitute a transport driving unit DVt that transmits a driving force of the motor 201 to the transport driving rollers 51, 61 and 71 to drive the transport unit 122 (including the transport driving rollers 51, 61 and 71). The gears 234, 236, 238, 239 and 240 constitute a feeding driving unit DVp that transmits the driving force from the output shaft 233 of the electromagnetic clutch 230 to the pickup roller 102 and the feeding roller 103 to drive the feeding unit 121 (including the pickup roller 102 and the feeding roller 103). The coupling 220 and the gears 218, 221, 222, 224, 226 and 232 constitute a driving force transmission unit DVq that transmits the driving force from the transport driving unit DVt to the input shaft 231 of the electromagnetic clutch 230.

The transport driving unit DVt is provided upstream of the driving force transmission unit DVq along a transmission path of the driving force (i.e., a driving force transmission path). The driving force transmission unit DVq is provided upstream of the feeding driving unit DVp along the driving force transmission path. In other words, the feeding driving unit DVp is provided downstream of the driving force transmission unit DVq along the driving force transmission path. The driving force transmission unit DVq is provided downstream of the transport driving unit DVt along the driving force transmission path.

Detection signals outputted from the sensors 131, 132 and 133 are transmitted to a control unit 160 (FIG. 1) of the image reading apparatus 100. Image signal corresponding to an image read by the reading unit 113 is transmitted to an image processing unit 170 (FIG. 1). The control unit 160 controls timings to perform image reading by the image reading unit 113 and image processing by image processing unit 170.

The control unit 160 also controls start and stop of the motor 201, and controls turning on and off of the electromagnetic clutch 230 (i.e., connection and disconnection of the driving force).

In the above described configuration, the feeding unit 121, the transport unit 122, the motor 201, the electromagnetic clutch 230, the transport driving unit DVt, the feeing driving unit DVp, the driving force transmission unit DVq constitute a medium transport device.

<Operation of Image Reading Apparatus>

An operation of the image reading apparatus 100 will be described.

In FIG. 1, when the document media 110 are placed on the medium placing plate 101, the first sensor 131 is pressed by the document media 110, and outputs detection signal. When the control unit 160 receives the detection signal from the first sensor 131, the control unit 160 recognizes that the document media 110 are placed on the medium placing plate 101.

When the control unit 160 receives a reading start signal StR from a reading start switch provided on the image reading apparatus 100 or an external device such as a personal computer, the control unit 160 causes the motor 201 to start rotating. The rotation of the motor 201 is transmitted to the transport driving rollers 51, 61 and 71 via the transport driving unit DVt, and is transmitted to the ejection driving roller 81 via the driving force transmission unit DVq and the gear 225. Therefore, the transport driving rollers 51, 61 and 71 and the ejection driving roller 81 start rotating. Further, when the control unit 160 turns on the electromagnetic clutch 230 (i.e., starts application of current to the electromagnetic clutch 230), the rotation is transmitted to the pickup roller 102 and the feeding roller 103 via the feeding driving unit DVp. Therefore, the pickup roller 102 and the feeding roller 103 start rotating.

The pickup roller 102 and the feeding roller 103 feed one of the document media 110 placed on the medium placing plate 101. The document medium 110 is transported along the medium transport path 116 by the first transport rollers 105 and the second transport rollers 106, and reaches a position between the holding member 111 and the transparent plate 112.

When a predetermined time elapses after the third sensor 133 detects a leading edge of the document medium 110, the control unit 160 stops applying current to the electromagnetic clutch 230. That is, the electromagnetic clutch 230 is turned off, and the output shaft 233 of the electromagnetic clutch 230 and the gear 236 stop rotating. Therefore, the pickup roller 102 and the feeding roller 103 stop rotating.

When a certain time elapses after the third sensor 133 detects the leading edge of the document medium 110, the leading edge of the document medium 110 reaches the reading position 114. As the document medium 110 passes the reading position 114, the image reading unit 113 reads an image on the document medium 110. Then, the document medium 110 is transported by the third transport rollers 107, and is ejected by the ejection rollers 108. The ejected document medium 110 is placed on the medium ejection plate 115.

When a certain time elapses after the second sensor 132 detects a trailing edge of the document medium 110, the control unit 160 turns on the electromagnetic clutch 230. As the electromagnetic clutch 230 is turned on, the pickup roller 102 and the feeding roller 103 of the feeding driving unit DVp rotate to feed a next document medium 110. The following processes are the same as those described above.

In the above described operation, the electromagnetic clutch 230 is turned on to feed the next document medium 110, when the certain time elapses after the second sensor 132 detects the trailing edge of the document medium 110. An increase in load on the pickup roller 102 and the feeding roller 103 is transmitted to the transport driving unit DVt which is located upstream of the electromagnetic clutch 230 along the driving force transmission path. The increase in load causes minute deformation of respective parts (i.e., driving members) of the transport driving unit DVt (located upstream of the electromagnetic clutch 230 along the driving force transmission path), and therefore speeds of the respective driving members of the transport driving unit DVt may decrease.

If a transport speed of the document medium 110 by the second transport rollers 106 (in the upstream vicinity of the reading position 114) and the third transport rollers 107 (downstream vicinity of the reading position 114) decrease while the document medium 110 is being read by the image reading unit 113, a failure in reading may occur. For example, a read image may be lengthened as compared with an image on the document medium 110.

In order to solve this problem, in Embodiment 1 of the present invention, the coupling 220 (i.e., the soft coupling) having a cushioning effect is provided between the transport driving unit DVt (that transmits the driving force to the second and third transport driving rollers 61 and 71) and the electromagnetic clutch 230. With such a configuration, it becomes possible to suppress changes in speeds of the second and third transport driving rollers 61 and 71 of the transport driving unit DVt located upstream of the electromagnetic clutch 230 along the driving force transmission path.

More specifically, the gear 218 mounted on the shaft 701 of the third transport driving roller 71 receives the driving force from the shaft 701 via the coupling 220 including the cushioning members 510 and 520. The cushioning members 510 and 520 transmit rotation by being compressed in the circumferential direction. The degree of compression of the cushioning members 510 and 520 changes depending on the load. Therefore, before the electromagnetic clutch 230 is turned on, the cushioning members 510 and 520 transmit rotation while being compressed (with the torque La) to the length Sa in the circumferential direction as shown in FIG. 7A. In contrast, after the electromagnetic clutch 230 is turned on, the cushioning members 510 and 520 transmit rotation while being compressed (with the torque Lb larger than the torque La) to the length Sb (shorter than the length Sa) in the circumferential direction as shown in FIG. 7B.

Since the degree of compression of the cushioning members 510 and 520 changes in this way, an influence of the increase in load is prevented from being transmitted upstream of the coupling 220 along the driving force transmission path. Therefore, minute deformations of driving members of the transport driving unit DVt (located upstream of the second and third transport driving rollers 61 and 71) can be prevented. Accordingly, the changes in speeds of the second and third transport driving rollers 61 and 71 can be suppressed. As a result, a failure in reading (for example, lengthening of a read image) can be suppressed to a sufficiently low level.

When the cushioning members 510 and 520 are compressed, speeds of the driving members located downstream of the gear 221 may decrease. However, experiments showed that the decrease in speeds of the driving members located downstream of the gear 221 causes no problem other than a minute change in timing at which the feeding unit 121 feeds the document medium 110 and timing at which the ejection rollers 108 eject the document medium 110.

The experiments were performed using the cushioning members 510 and 520 formed of urethane foam having hardness of 45 degrees. A motor shaft torque was 200 mN·m. The experiments were performed while setting the transport speed to 160 mm/sec and 255 mm/sec.

As described above, according to Embodiment 1 of the present invention, in a case where a change in load occurs downstream of the transport rollers located in the upstream and downstream vicinity of the reading position, the coupling having a cushioning effect is provided downstream (along the driving force transmission path) of the transport rollers located in the upstream and downstream vicinity of the reading position. As the driving force is transmitted via the coupling, the change in load is absorbed by the coupling. Therefore, it becomes possible to reduce changes in speeds of the transport rollers located in the upstream and downstream vicinity of the reading position along the medium transport path. Accordingly, a failure in reading (for example, lengthening of a read image) can be suppressed to a sufficiently low level.

Further, the cushioning members 510 and 520 are used only to absorb the change in load. The inner ring 300 of the coupling 220 supports the outer ring 400 by the sliding contact between the outer circumferential surface of the inner ring 300 and the inner circumferential surface of the outer ring 400. That is, the cushioning members 510 and 520 do not support the outer ring 400. Therefore, elastic coefficient of the cushioning members 510 and 520 can be determined in view of absorption of the change in load. That is, optimum elastic coefficient may be selected so as to effectively absorb the change in load. For example, the cushioning members 510 and 520 may be formed of a material with sufficient softness (i.e., having a relatively small spring coefficient).

In examples shown in FIGS. 3 through 6, the cushioning members 510 and 520 are fixed to the engaging portions 310 and 320 of the inner ring 300, and contact the engaging portions 410 and 420 of the outer ring 400 to transmit the torque (i.e., the driving force). However, it is also possible that the cushioning members 510 and 520 are fixed to the engaging portions 410 and 420 of the outer ring 400, and contact the engaging portions 310 and 320 of the inner ring 300 to transmit the torque. In other words, it is only necessary that the cushioning members 510 and 520 are fixed to the engaging portions of one of the inner ring 300 and the outer ring 400, and contact the engaging portions of the other of the inner ring 300 and the outer ring 400 to transmit the torque.

Embodiment 2

Figure 8:
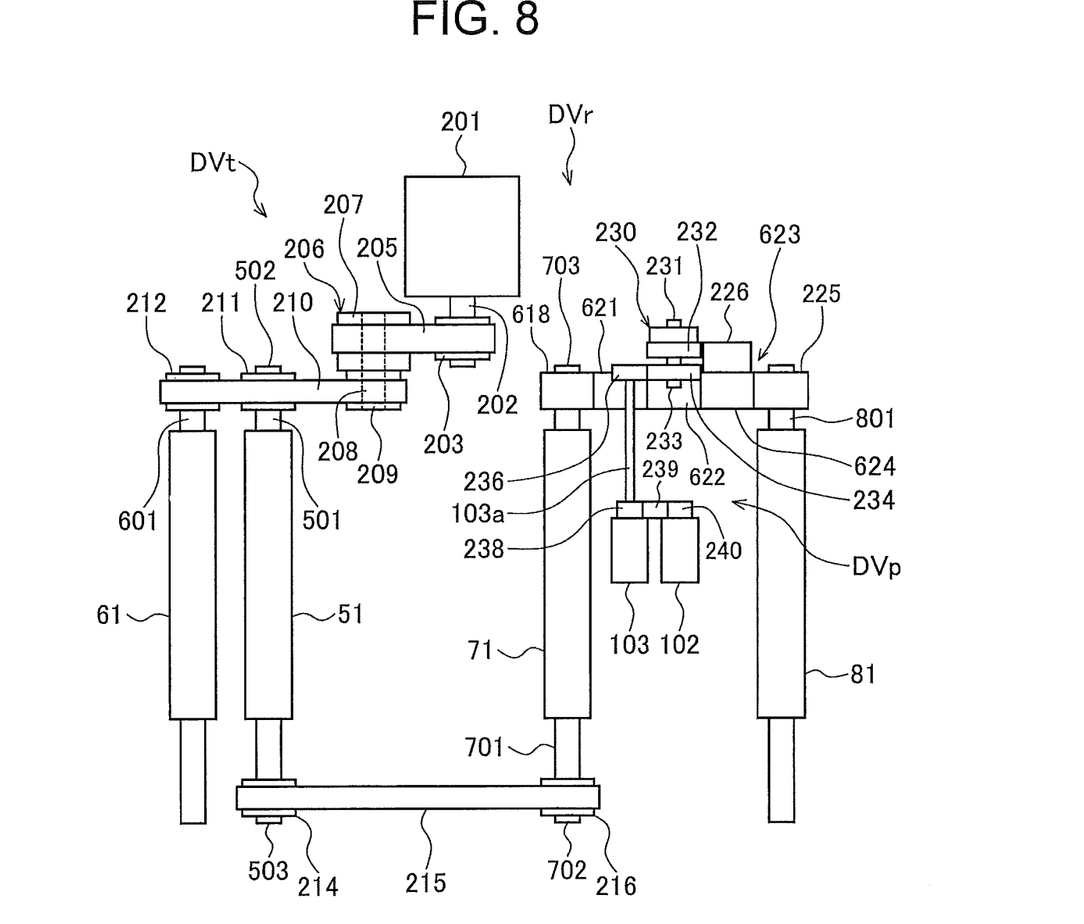
FIG. 8 is a schematic view showing a driving system of an image reading apparatus according to Embodiment 2 of the present invention.
Figure 9:
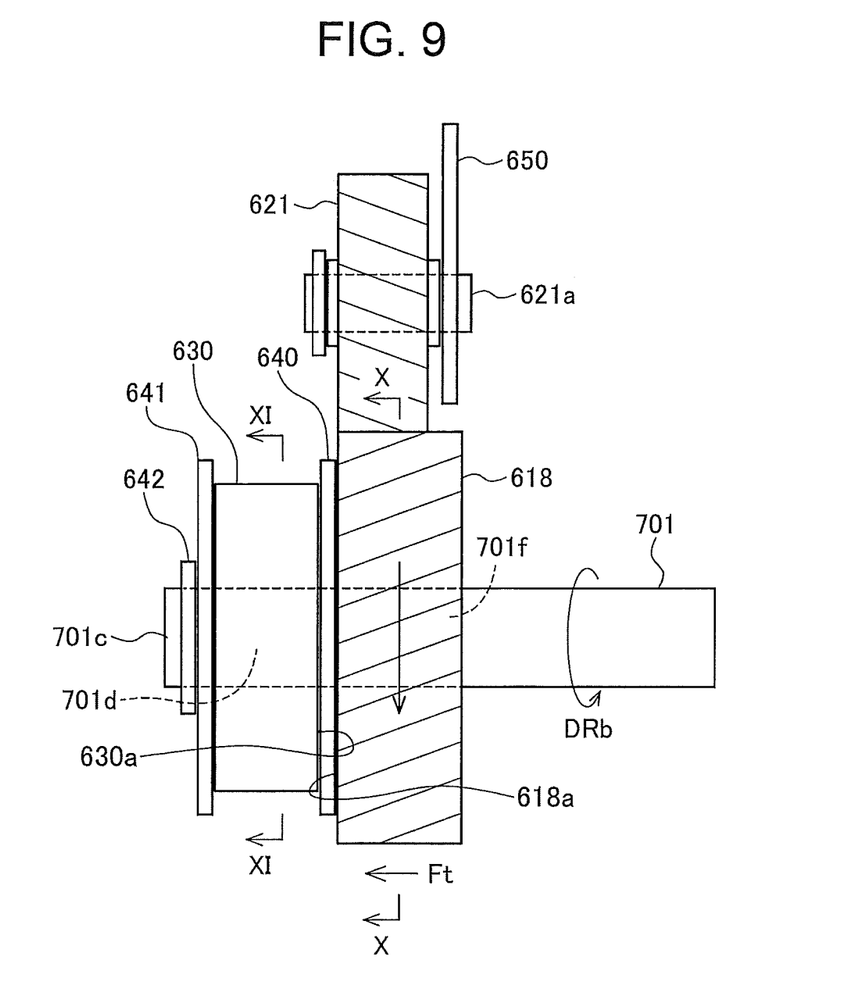
FIG. 9 is a schematic view showing a flexible driving force transmission unit according to Embodiment 2.
Figure 10:
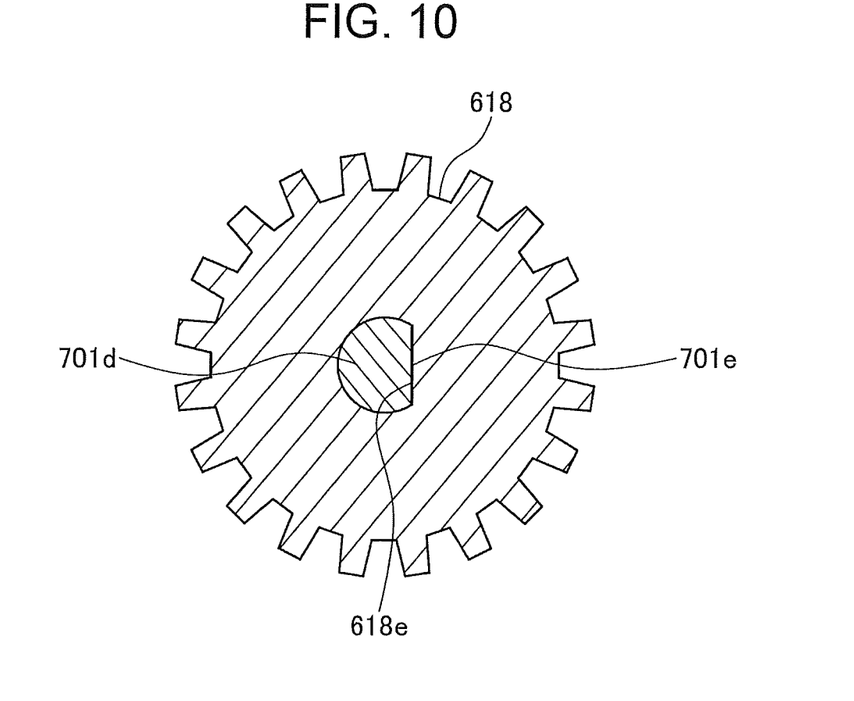
FIG. 10 is a sectional view taken along line X-X in FIG. 9.
Figure 11:
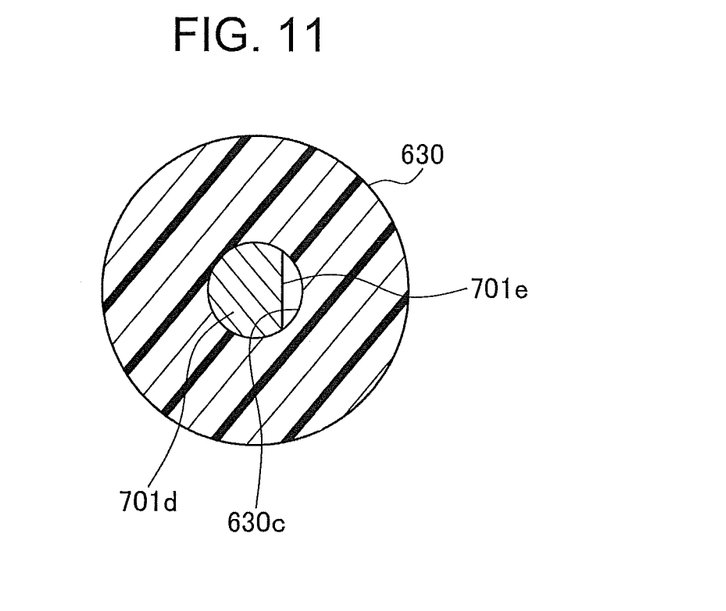
FIG. 11 is a sectional view taken along line XI-XI in FIG. 9.

Embodiment 2 of the present invention will be described. FIG. 8 is a schematic view showing a driving system of an image reading apparatus according to Embodiment 2. FIG. 9 is a schematic view showing a flexible driving force transmission unit according to Embodiment 2. FIG. 10 is a sectional view taken along line X-X in FIG. 9. FIG. 11 is a sectional view taken along line XI-XI in FIG. 9.

In the above described Embodiment 1, the coupling 220 including the cushioning members 510 and 520 (i.e., having the cushioning effect) is used to absorb the change in load. In Embodiment 2, a helical gear and a cushioning member constitute a driving force transmission unit (i.e., a flexible driving force transmission unit) that absorbs the change in load.

In Embodiment 2, helical gears 618, 621 and 622 (FIG. 8) are used in replacement of the gears 218, 221 and 222 (FIG. 2). Further, a two-stage gear 623 (FIG. 9) is used in replacement of the gear two-stage 223 (FIG. 2). The two-stage gear 623 includes a helical gear 624 that engages the helical gear 622. The helical gear 618 (i.e., a first member) is mounted to the shaft 701 (i.e., a first shaft) so as not to be rotatable in a rotating direction and so as to be slidable along the shaft 701 in the axial direction.

As shown in FIG. 9, a cushioning member 630 is fixed to the end portion of the shaft 701 penetrating the helical gear 618. The cushioning member 630 has a cylindrical shape.

A portion 701*f* of the shaft 701 penetrates the helical gear 618. A portion 701*d* of the shaft 701 is defined between the end surface 701*c* of the shaft 701 and the portion 701*f*. The portions 701*f* and 701*d* have D-shaped cross sections. That is, a part (i.e., a cutout part 701*e*) of a circumference of each of the portions 701*f* and 701*d* is cut out by a plane parallel to a rotation axis of the shaft 701. The helical gear 618 has a through-hole having a D-shaped cross section. That is, an inner circumference 618*e* of the through-hole has a D-shape so as to correspond to the portions 701*f* and 701*d* of the shaft 701 (FIG. 10). In contrast, an inner circumference 630*e* of the cushioning member 630 has a cylindrical shape.

A retainer ring 642 is fixed in the vicinity of the end surface 701*c* of the shaft 701. The retainer ring 642 restricts a movement of the cushioning member 630 in a direction toward the end surface 701*c* of the shaft 701.

A sliding member 641 is provided between the cushioning member 630 and the retainer ring 642. The sliding member 641 has a disk shape. The helical gear 618 and the cushioning member 630 have end surfaces 618*a* and 630*a* facing each other. A sliding member 640 is provided between the end surfaces 618*a* and 630*a* of the helical gear 618 and the cushioning member 630. The sliding member 640 has a disk shape.

The end surface 618*a* of the helical gear 618 and the sliding member 640 are slidable with respect to each other. The retainer ring 642 and the sliding member 641 are slidable with respect to each other.

The helical gear 621 (i.e., a second member) has a shaft 621a (i.e., a second shaft) parallel to the shaft 701. The helical gear 621 is supported by a supporting frame 650 so as to be rotatable and so as not to be movable in the axial direction.

The cushioning member 630 is resiliently deformable. The cushioning member 630 may be formed of elastomer material such as urethane foam or rubber, or may be formed of metal coil spring of metal. Here, the cushioning member 630 is formed of urethane foam.

When the shaft 701 rotates in a direction shown by an arrow DRb in FIG. 9, a thrust force Ft is generated between the helical gear 618 and the helical gear 621. The thrust force Ft forces the helical gear 618 in a direction toward the end surface 701c of the shaft 701. Therefore, the end surface 618a of the helical gear 618 is pressed against the cushioning member 630 via the sliding member 640. Since the retainer ring 642 is fixed to the shaft 701, the cushioning member 630 is applied with a reactive force. As a result, the cushioning member 630 is compressed in the axial direction with a compression ratio corresponding to the thrust force Ft, i.e., a load.

Figure 12A:
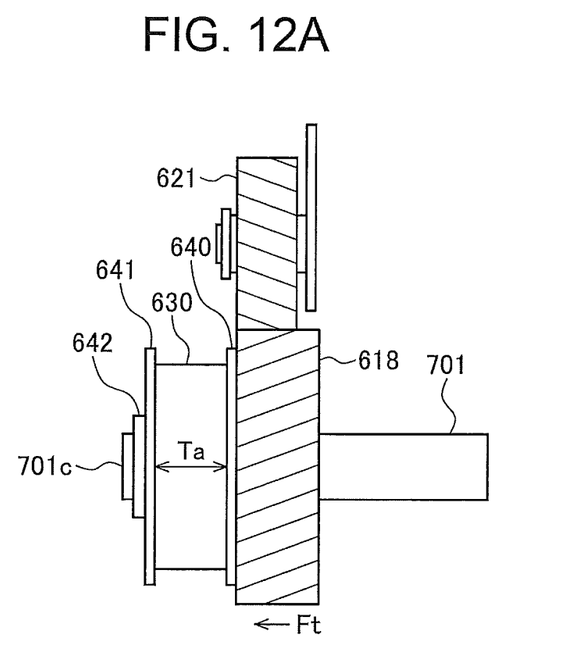
FIGS. 12A and 12B are views as seen in the same direction as FIG. 9 for showing a change in degree of compression of a cushioning member of the flexible coupling.
Figure 12B:
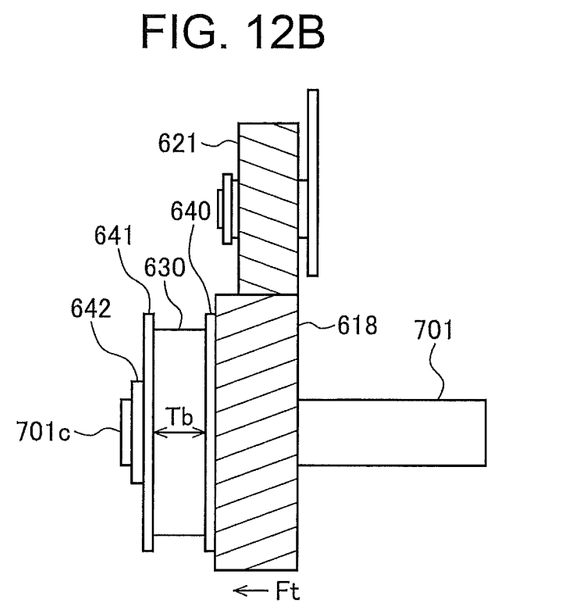

FIGS. 12A and 12B are schematic views for illustrating a change in degree of compression of the cushioning member 630 according to the load (i.e., the thrust force Ft). FIG. 12A shows a state where the electromagnetic clutch 230 is turned off, and therefore a small load is applied. FIG. 12B shows a state where the electromagnetic clutch 230 is turned off, and therefore a large load is applied. In the state shown in FIG. 12A, a length of the cushioning member 630 in the axial direction of the shaft 701 is expressed as Ta. In the state shown in FIG. 12B, a length of the cushioning member 630 in the axial direction of the shaft 701 is expressed as Tb, which is shorter than the length Ta.

When the helical gear 618 is pressed against the cushioning member 630, the sliding members 640 and 641 and the cushioning member 630 rotate at the same rotation speed as or at a lower rotation speed than the shaft 701 due to a friction force between the helical gear 618 and the sliding member 640 and a friction force between the retainer ring 642 and the sliding member 641.

If a force with which the helical gear 618 is pressed against the cushioning member 630 is small, the friction force between the helical gear 618 and the sliding member 640 and the friction force between the retainer ring 642 and the sliding member 641 are small. Therefore, a difference between the rotation speed of the sliding members 640 and 641 and the cushioning member 630 and the rotation speed of the shaft 701, the helical gear 618 and the retainer ring 642 is large. If the sliding members 640 and 641 are not provided, the cushioning member 630 may be worn by friction with the helical gear 618 and the retainer ring 642. With the provision of the sliding members 640 and 641, the cushioning member 630, the helical gear 618 and the retainer ring 642 can smoothly rotate relative to each other, and wear of the cushioning member 630 can be reduced.

An entire operation of the transport device of Embodiment 2 is the same as that of Embodiment 1.

In the driving system shown in FIG. 8, the helical gears 618, 621, 622 and 624 and the gear 226 and 232 constitute a driving force transmission unit DVr that transmits the driving force from the transport driving unit DVt to the input shaft 231 of the electromagnetic clutch 230.

As was described in Embodiment 1, when the electromagnetic clutch 230 is turned on, an increase in load on the pickup roller 102 and the feeding roller 103 is transmitted to the transport driving unit DVt which is located upstream of the electromagnetic clutch 230 along the driving force transmission path.

The helical gear 618 is provided on the shaft 701 of the third transport driving roller 71 as described above. A position of the helical gear 618 in the axial direction changes according to the degree of compression of the cushioning member 630. Therefore, before the electromagnetic clutch 230 is turned on, the helical gear 618 transmits the driving force while the cushioning member 630 is compressed by the thrust force (corresponding to a load La) to the length Ta in the axial direction as shown in FIG. 12A. In contrast, when the electromagnetic clutch 230 is turned on, the helical gear 618 transmits the driving force while the cushioning member 630 is compressed by the thrust force (corresponding to a load Lb larger than the load La) to the length Tb (shorter than the length Ta) in the axial direction as shown in FIG. 12B.

Since the degree of compression of the cushioning member 630 changes in this way, an influence of the increase in load is prevented from being transmitted upstream of the helical gear 618 along the driving force transmission path. Therefore, minute deformations of driving members of the transport driving unit DVt (located upstream of the second and third transport driving rollers 61 and 71) can be prevented. Accordingly, the change in speeds of the driving rollers 61 and 71 of the second transport rollers 106 and the third transport rollers 107 can be suppressed. As a result, a failure in reading (for example, lengthening of a read image) can be suppressed to a sufficiently low level.

When the cushioning member 630 is compressed, speeds of the driving members located downstream of the helical gear 621 may decrease. However, experiments showed that the decrease in speeds of the driving members located downstream of the helical gear 621 causes no problem other than a minute change in timing at which the feeding unit 121 feeds the document medium 110 and timing at which the ejection rollers 108 eject the document medium 110. The experiments were performed using the cushioning member 630 formed of urethane foam having hardness of 45 degrees. A motor shaft torque was 200 mN·m. The experiments were performed while setting the transport speed to 160 mm/sec and 255 mm/sec.

As described above, according to Embodiment 2 of the present invention, in a case where a change in load that occurs downstream of the transport rollers located in the upstream and downstream vicinity of the reading position, the driving force transmission unit (i.e., the flexible driving force transmission unit) having a cushioning effect is provided downstream (along the driving force transmission path) of the transport rollers located in the upstream and downstream vicinity of the reading position. The driving force transmission unit includes a pair of the helical gears and the cushioning member. As the driving force is transmitted via the driving force transmission unit having the cushioning effect, the change in load is absorbed. Therefore, it becomes possible to reduce changes in speeds of the transport rollers located in the upstream and downstream vicinity of the reading position along the medium transport path. Accordingly, a failure in reading (for example, lengthening of a read image) can be suppressed to a sufficiently low level.

Further, the cushioning member 630 is used only to absorb the change in load. The helical gear 618 is supported by the shaft 701. That is, the helical gear 618 is not supported by the cushioning member 630. Therefore, elastic coefficient of the cushioning member 630 can be determined in view of absorption of the change in load. That is, optimum elastic coefficient may be selected so as to effectively absorb the change in load. For example, the cushioning member 630 may be formed of a material with sufficient softness (i.e., having a relatively small spring coefficient).

Figure 13:
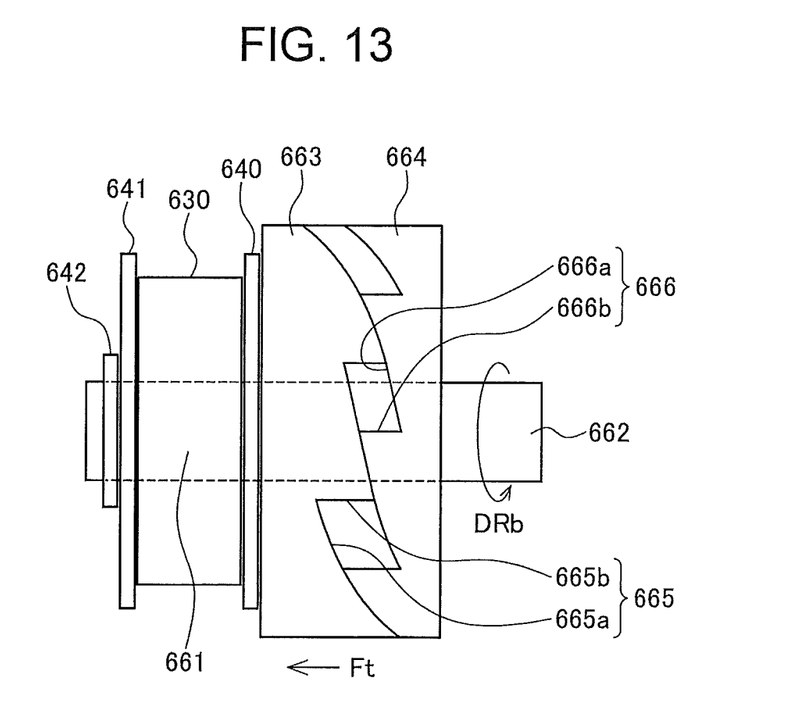
FIG. 13 is a side view showing a modification of the flexible driving force transmission device according to Embodiment 2.

In examples shown in FIGS. 8 through 11, the driving force transmission unit having the cushioning effect is constituted by the pair of the helical gears and the cushioning member which is resiliently deformed by the thrust force in the axial direction of the helical gear. However, the present invention is not limited to such a configuration. For example, as shown in FIG. 13, the driving force transmission unit may include a first shaft 661 and a second shaft 662 aligned with each other. A first flange member 663 is mounted to the first shaft 661 so as not to be rotatable in the rotating direction and so as to be slidable in the axial direction of the first shaft 661. A second flange member 664 is mounted to the second shaft 662 so as not to be rotatable in the rotating direction and so as not to be slidable in the axial direction. The first flange member 663 and the second flange member 664 have saw-like end surfaces 665 and 666 that engage each other. The saw-like end surface 665 includes inclined portions 665a and axial portions 665b which are mutually alternately arranged. The inclined portions 665a are inclined with respect to the rotating direction and the axial direction. The axial portions 665b extend in the axial direction. The saw-like end surface 666 includes inclined portions 666a and axial portions 666b alternately arranged. The inclined portions 666a are inclined with respect to the rotating direction and the axial direction. The axial portions 666b extend in the axial direction. When the second shaft 662 rotates in a direction shown by an arrow DRa, the inclined portions 665a and 666a contact each other to transmit the driving force (i.e., the torque). In this state, the thrust force Ft is also generated in the axial direction by contact between the inclined portions 665a and 666a. With the thrust force Ft, the first flange member 663 moves in the axial direction while compressing the cushioning member 630. That is, the degree of compression of the cushioning member 630 depends on the thrust force, i.e., the driving force (torque) to be transmitted.

In other words, the driving force transmission unit of Embodiment 2 may include:

a first member (618) mounted to a first shaft (701) so as not to be rotatable in a rotating direction and so as to be slidable (movable) along the first shaft (701) in an axial direction;

a second member (621) mounted to a second shaft (621a), engaging the first member (618) to transmit a torque (i.e., a driving force), and applying a thrust force to the first member (618) when transmitting the torque; and a cushioning member (630) which is resiliently compressed by the first member (618) when the first member (618) moves in the axial direction.

In the above described embodiments, examples of the image reading apparatus to which the present invention is applied have been described. An example of such an image reading apparatus is an image scanner. However, the image reading apparatus may also be used as a part of a copier.

The present invention is also applicable to an image forming apparatus using electrophotography. Examples of the image forming apparatus are, for example, a printer, a facsimile or the like. Further, the image forming apparatus may be used as a part of a copier.

Figure 14:
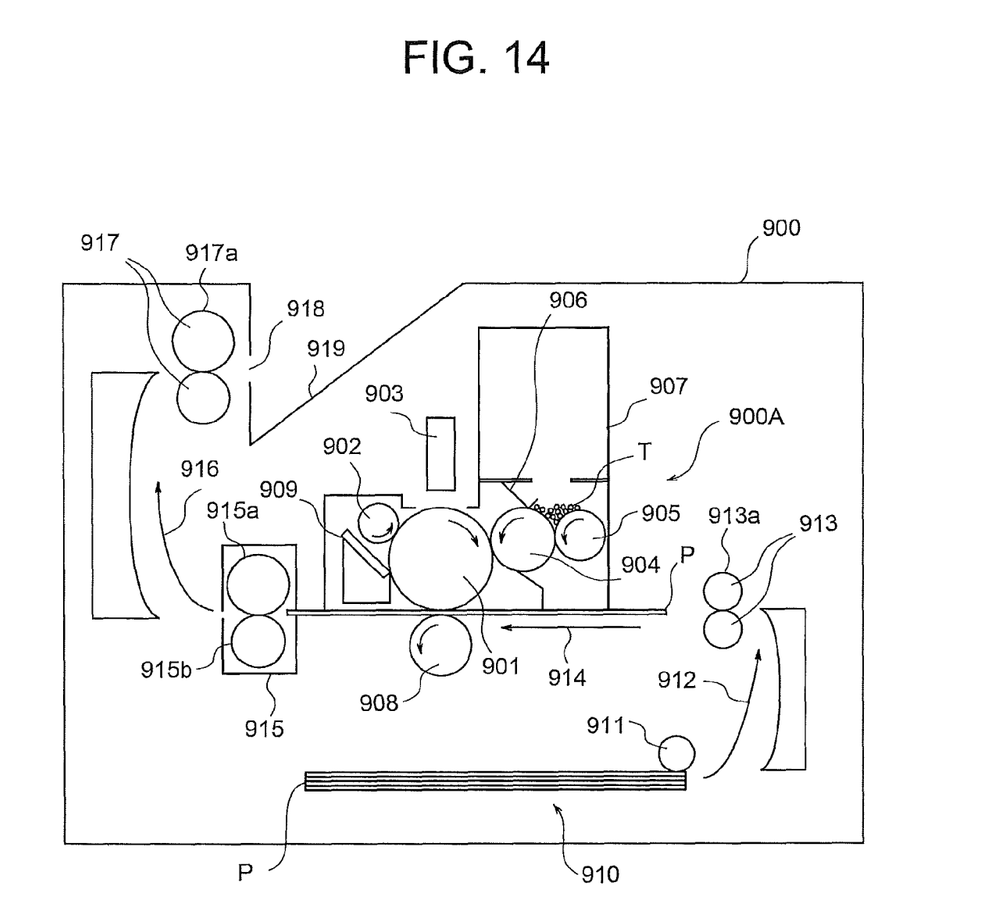
FIG. 14 is a schematic view showing an image forming apparatus to which the flexible driving force transmission device of Embodiments 1 and 2 are applicable.

FIG. 14 is a schematic view showing an example of the image forming apparatus. The image forming apparatus 900 shown in FIG. 14 is configured as, for example, a printer. The image forming apparatus 900 includes a medium storage cassette 910 in which printing media (i.e., printing sheets) P are stored, a pickup roller 911 that feeds each printing medium P in a direction shown by an arrow 912, and transport rollers 913 that transport the printing medium P in a direction shown by an arrow 914. The image forming apparatus 900 further includes an image forming unit 900A that forms a toner image (i.e., a developer image) on the printing medium P transported by the transport rollers 913, and a fixing unit 915 that fixes the toner image to the printing medium P and transports the printing medium P as shown by an arrow 916. The image forming apparatus 900 further includes ejection rollers 917 that eject the printing medium P via an ejection port 918 to a stacker provided on a top cover of the image forming apparatus 900.

The image forming unit 900A includes a photosensitive drum 901 as an image bearing body, a charging roller 902 as a charging member, a developing roller 904 as a developer bearing body, a supplying roller 905 as a supplying member, a developing blade 906 as a developer regulating member, a toner cartridge 907 as a developer storage body, and a cleaning blade 909 as a cleaning member. Further, an LED (Light Emitting Diode) head 903 as an exposure unit is disposed above and facing the photosensitive drum 901. A transfer roller 908 as a transfer member is disposed below and facing the photosensitive drum 901.

The photosensitive drum 901 has a cylindrical shape, and has a photoconductive layer on a surface thereof. The charging roller 902 uniformly charges the surface of the photosensitive drum 901. The LED head 903 emits light to expose the surface of the photosensitive drum 901 to form a latent image. The developing roller 904 develops the latent image with a toner (i.e., a developer) T to form a toner image. The supplying roller 905 supplies the toner T (supplied by the toner cartridge 907) to the developing roller 904. The developing blade 906 regulates a thickness of a layer of the toner T on the surface of the developing roller 904. The transfer roller 908 transfers the toner image from the photosensitive drum 901 to the printing medium P. The cleaning blade 909 removes a residual toner remaining on the photosensitive drum 901.

The fixing unit 915 includes a fixing roller 915a and a pressure roller 915b provided facing each other. The fixing roller 915a and the pressure roller 915b transport the printing medium P, and apply heat and pressure to the printing medium P so as to fix the toner image to the printing medium P.

The pickup roller 911, a driving roller 913a of the transport rollers 913, the photosensitive drum 901, the developing roller 904, the fixing roller 915a, and a driving roller 917a of the ejection rollers 917 are driven by a motor (not shown in FIG. 14). Further, the pickup roller 911 is driven via an electromagnetic clutch. The charging roller 902, the transfer roller 908 and the supplying roller 905 rotate following the rotation of the photosensitive drum 901.

In the image forming apparatus 900, it is necessary to keep constant a transport speed of the printing medium P when the printing medium P passes a transfer position (i.e., a position between the photosensitive drum 901 and the transfer roller 908). Therefore, the driving roller 913a of the transport rollers 913 and the fixing roller 915a of the fixing unit 915 (located in the upstream and downstream vicinity of the transfer position) are needed to rotate at a constant speed. Therefore, the coupling 220 of Embodiment 1 or the driving force transmission unit (having the cushioning effect) of Embodiment 2 is provided downstream of the driving roller 913a and the fixing roller 915a along the driving force transmission path and upstream of the electromagnetic clutch along the driving force transmission path. With such a configuration, a change in load (caused when the electromagnetic clutch is turned on) is absorbed. Therefore, it becomes possible to reduce changes in rotation speeds of the rollers (i.e., the driving roller 913a and the fixing roller 915a) located in the upstream and downstream vicinity of the transfer position.

In the above described embodiments, the electromagnetic clutch is used to connect and disconnect the transmission of the driving force. However, the present invention is not limited to such a configuration. Other mechanisms for connecting and disconnecting the transmission of the driving force may be used. For example, a combination of a planet gear and a solenoid may be used.

While the preferred embodiments of the present invention have been illustrated in detail, it should be apparent that modifications and improvements may be made to the invention without departing from the spirit and scope of the invention as described in the following claims.

What is claimed is:

1. A medium transport device comprising:
    a feeding unit that feeds a medium from a medium storage portion;
    a transport unit that transports the medium fed by the feeding unit;
    a driving source;
    a transport driving unit for driving the transport unit, the transport driving unit being driven by the driving source;
    a feeding driving unit for driving the feeding unit; and
    a driving force transmission unit that transmits the driving force from the transport driving unit to the feeding driving unit;
    wherein the driving force transmission unit comprises:
    a connection-and-disconnection unit that connects and disconnects a transmission of the driving force from the transport driving unit to the feeding driving unit; and
    a driving force transmission device transmitting the driving force from the transport driving unit to the connection-and-disconnection unit,
    wherein the driving force transmission device comprises:
    a first rotating portion having a first facing portion;
    a second rotating portion having a second facing portion, the second rotating portion having an operation range partially overlapping with that of the first rotating portion; and
    a cushioning member provided between the first facing portion and the second facing portion, the cushioning member being deformed by being applied with a pressure;
    wherein the first rotating portion and the second rotating portion transmit a driving force in a state where the cushioning member is deformed by application of the pressure; and
    wherein the driving force transmission device absorbs a change in load caused when the connection-and-disconnection unit connects or disconnects the transmission of the driving force.

2. The medium transport device according to claim 1, wherein the first rotating portion includes an inner ring fixed to a rotation shaft;
    wherein the second rotating portion includes an outer ring provided outside the inner ring;
    wherein the inner ring has a first engaging portion extending outwardly in a radial direction, the first engaging portion having a first end surface in a circumferential direction;
    wherein the outer ring has a second engaging portion extending inwardly in the radial direction, the second engaging portion having a second end surface in the circumferential direction;
    wherein the cushioning member is fixed to one of the first end surface and the second end surface, and contacts the other of the first end surface and the second end surface to transmit the driving force.

3. The medium transport device according to claim 2, wherein an inner circumferential surface of the second engaging portion is slidable on an outer circumferential surface of the inner ring at a portion where the first engaging portion is not disposed.

4. An image reading apparatus comprising:
    the medium transport device according to claim 1; and
    a reading unit that reads an image on the medium transported by the medium transport device.

5. An image forming apparatus comprising:
    the medium transport device according to claim 4; and
    an image forming unit that forms an image on the medium transported by the medium transport device.

* * * * *